United States Patent
Barker et al.

(10) Patent No.: US 6,182,049 B1
(45) Date of Patent: Jan. 30, 2001

(54) METHOD AND APPARATUS FOR CONTROLLING PRODUCT ROUTING IN A MANUFACTURING LINE

(75) Inventors: Brian C. Barker, Poughkeepsie; Lawrence R. Bauer, Newburgh; Susan E. Chaloux; John T. Federico, both of Wappingers Falls; Perry G. Hartswick, Millbrook, all of NY (US)

(73) Assignee: International Business Machines Corporation, Armonk, NY (US)

(*) Notice: Under 35 U.S.C. 154(b), the term of this patent shall be extended for 0 days.

(21) Appl. No.: 09/020,275

(22) Filed: Feb. 6, 1998

(51) Int. Cl.[7] ................................................. G06F 17/60
(52) U.S. Cl. ........................ 705/7; 702/82; 702/83; 702/84; 700/109; 700/110
(58) Field of Search ............................. 705/7; 702/83, 702/82, 84; 700/109, 110

(56) References Cited

U.S. PATENT DOCUMENTS

| | | | |
|---|---|---|---|
| 3,725,867 | * 4/1973 | Jordan | 340/172.5 |
| 4,381,447 | * 4/1983 | Horvath et al. | 250/223 R |
| 4,580,226 | * 4/1986 | Bennison | 364/478 |
| 4,691,830 | 9/1987 | Ahl et al. | 209/523 |
| 4,829,445 | 5/1989 | Burney | 364/478 |
| 4,888,692 | 12/1989 | Gupta et al. | 364/402 |
| 5,006,992 | 4/1991 | Skeirik | 364/513 |
| 5,050,088 | 9/1991 | Buckler et al. | 364/468 |
| 5,191,313 | 3/1993 | Galbraith | 340/501 |
| 5,233,533 | 8/1993 | Edstrom et al. | 364/468 |
| 5,311,438 | 5/1994 | Sellers et al. | 364/468 |
| 5,327,437 | 7/1994 | Balzer | 371/25.1 |
| 5,386,360 | 1/1995 | Wilson et al. | 364/146 |
| 5,396,432 | * 3/1995 | Saka et al. | 364/468 |
| 5,442,561 | 8/1995 | Yoshizawa et al. | 364/468 |
| 5,493,501 | * 2/1996 | Kondo | 364/468 |
| 5,612,886 | * 3/1997 | Weng | 364/468.07 |
| 5,841,677 | * 11/1998 | Yang et al. | 364/569 |
| 6,021,359 | * 2/2000 | Sakakibara et al. | 700/108 |
| 6,026,365 | * 2/2000 | Hayaski | 705/9 |
| 6,070,130 | * 5/2000 | Gutmann et al. | 702/81 |

FOREIGN PATENT DOCUMENTS 0 755 861 A1 * 1/1997 (EP) .......................... 57/20

OTHER PUBLICATIONS

S. Bederman and L. G. Lankford, "Selective Assembly System", IBM Technical Disclosure Bulletin, Nov. 1967, p. 731.*

H. Hadj–Salem et al., "ALINEA: A Local Feedback Control Law for On–Ramp Metering: A Real–Life Study", Third International Conference on Road Traffic Control, 1990, p. 194–198.*

* cited by examiner

Primary Examiner—Eric W. Stamber
Assistant Examiner—Steven F. Vincent
(74) Attorney, Agent, or Firm—Ratner & Prestia

(57) ABSTRACT

In a manufacturing line having a plurality of production jobs performed on a plurality of production units in a plurality of processing areas, a method and related system for selecting a number of production units to be sent to a designated process area other than the plurality of processing areas.

18 Claims, 2 Drawing Sheets

METHOD AND APPARATUS FOR CONTROLLING PRODUCT ROUTING IN A MANUFACTURING LINE

TECHNICAL FIELD

This invention relates to a method and associated system for diverting a number of production units to a designated processing area in a manufacturing line and more particularly a method and associated system for selecting and diverting a limited sample of units for product quality testing and/or analysis.

BACKGROUND OF THE INVENTION

Within a manufacturing line, it is sometimes necessary to have a limited number of production units over a given time go through particular designated areas of the manufacturing line, for instance to be tested and/or analyzed. Often a list of sequential process steps is specified for each production unit to denote each step that must be completed before the unit may proceed to the next step.

A testing and/or analysis operation is often a time-consuming operation, therefore it is desirable to sample only a limited number of production units on which to perform such tests, using sampling techniques designed to assure the sample group is representative of the pool of all production units. Precisely because the results of testing or analysis so performed on the sample group is considered to be representative of the pool from which the sample was taken, every unit in the pool is a candidate for selection into the sample group, even though the majority of these production units are not ultimately selected to be in the sample group that is actually tested and/or analyzed.

In a production line where only a limited number of units are selected for inspection, and where this selection requires diverting a selected unit from the normal flow of the production line to a designated station, there is need for a selection process which does not impede the normal flow of the production line. Such process, and the system implementing the process, must select representative units for testing without creating a back up of units during the selection process. In the past, all units waited in the queue for the designated station, while this selection was made randomly and manually by multiple workers using frequency logs to track the number or units tested or analyzed per weekly period. Typically, the manufacturing line backed up awaiting this determination, resulting in increased manufacturing time for all production units.

Systems and methods for scheduling or controlling work through manufacturing processes and/or collecting manufacturing data and applying it to process controllers are known.

U.S. Pat. No. 4,691,830, issued to Ahl et al. and assigned to Owens-Illinois, Inc., describes a completely automated system for inspection and sorting of molded containers, such as glass bottles, in a manufacturing process. The system in Ahl et al. is restricted to molded container manufacture, but is capable of distinguishing differing container cavity designs, automatically sampling a single container from each design for inspection at a predetermined time interval, comparing the inspection results with predetermined data and determining if a re-sample is required, automatically diverting all containers of a newly encountered cavity design for inspection until a predetermined number is reached, and automatically resetting upon a predetermined time corresponding to the factory worker shift change.

What is missing from the prior art, however, is a sampling process and associated system implementing a process that prevents production backups at the point of sampling while at the same time assuring representative sampling by selecting production units on the basis of a number of a combination of criteria, such as predetermined time intervals, response to the total number of units produced, and a periodic quota.

SUMMARY OF THE INVENTION

There is provided by the present invention, a method and associated system for selecting a quantity, usually a limited number, of units or lots to go to a designated area, usually for testing or analysis, based on predetermined criteria for the time interval between selections, the maximum quantity of units that can consecutively bypass testing or analysis, and the maximum quantity of units that will be selected in a given time period, for instance in a week. The present invention also provides overriding ability to ignore the predetermined criteria and divert any arbitrary number, including all units, to the designated area.

More particularly, for a manufacturing line wherein a plurality of production jobs are performed on a plurality of units in a plurality of processing areas, the present invention comprises a method for diverting a number of said plurality of production units to a designated area other than the plurality of processing areas, comprising the steps of:

a) counting the number of production units that bypass the designated area beginning every time a production unit is diverted to the designated area, to obtain a unit bypass count;

b) counting the number of units diverted to the designated area to obtain a selected unit count;

c) measuring a first time interval beginning every time a production unit is diverted to the designated area;

d) comparing the unit bypass count, selected unit count and the first time interval to a preset value for each of said unit bypass count, selected unit count and first time interval respectively; and 1) diverting one of said plurality of units to the designated area when the measured first time interval is equal to or greater than the preset value for the first time interval and the selected unit count is less than the preset value for the selected unit count;

2) diverting one of said plurality of units to the designated area when the unit bypass count is equal to or greater than the preset value for the unit bypass count and the selected unit count is less than the preset value for the selected unit count.

Preferably, in the above method, steps (a) through (d) are performed for a preset time period, most preferably a week. At the expiration of the preset time period, the selected unit count is set to zero and steps (a) through (d) are repeated.

More preferably, any number of said plurality of units may be associated with an override marker, and the method further comprises diverting a unit so associated with said marker to the designated area without performing step (d).

There is also provided according to this invention, a system capable of implementing the above method, which system comprises:

a first clock which measures a first time interval beginning every time a production unit is diverted to the designated area and outputs a first time interval signal having a value representing said time interval, a unit bypass counter which outputs a unit bypass count signal having a value representing the number of production units that have bypassed the designated area since the last unit diverted to the designated area, a selected unit counter which outputs a selected unit count signal having a value representing the number of units diverted to the designated area, a memory containing a preset value for the unit bypass count, a preset value for the selected unit count and a preset value for the first time interval, a controller connected to the memory, to the first clock, to the unit bypass counter, and to the selected unit counter, said controller including a comparator for comparing the value of the signal from the bypass counter, from the selected unit counter, and from the first time clock to the respective preset values stored in said memory, said controller also including a unit selection device to divert one of the plurality of units to the designated area, when any one of the following two conditions are present:

(1) the value of the first time interval signal is greater than or equal to the preset value for the first time interval, and the value of the selected unit count signal is less than the preset value for the selected unit count; or (2) the value of the unit bypass count signal is greater than or equal to the preset value for the unit bypass count, and the value of the selected unit count signal is less than the preset value for the selected unit count.

The system may further include a second clock which measures a preset time period during which the system operates and at the expiration of which the selected unit counter is reset to zero, and the system operates for another preset time period.

The above system may still further include an override that can be activated to divert all units to the designated area without comparing preset values to measured values.

Both the method and system above can be advantageously used in an environment where the designated process area is an area where product quality testing or analysis is performed.

DETAILED DESCRIPTION OF THE INVENTION

The invention will next be illustrated with reference to the figures wherein similar numbers indicate same elements in all figures. Such figures are intended to be illustrative rather than limiting and are included herewith to facilitate the explanation of the system and related process implemented thereby.

Figure 1:
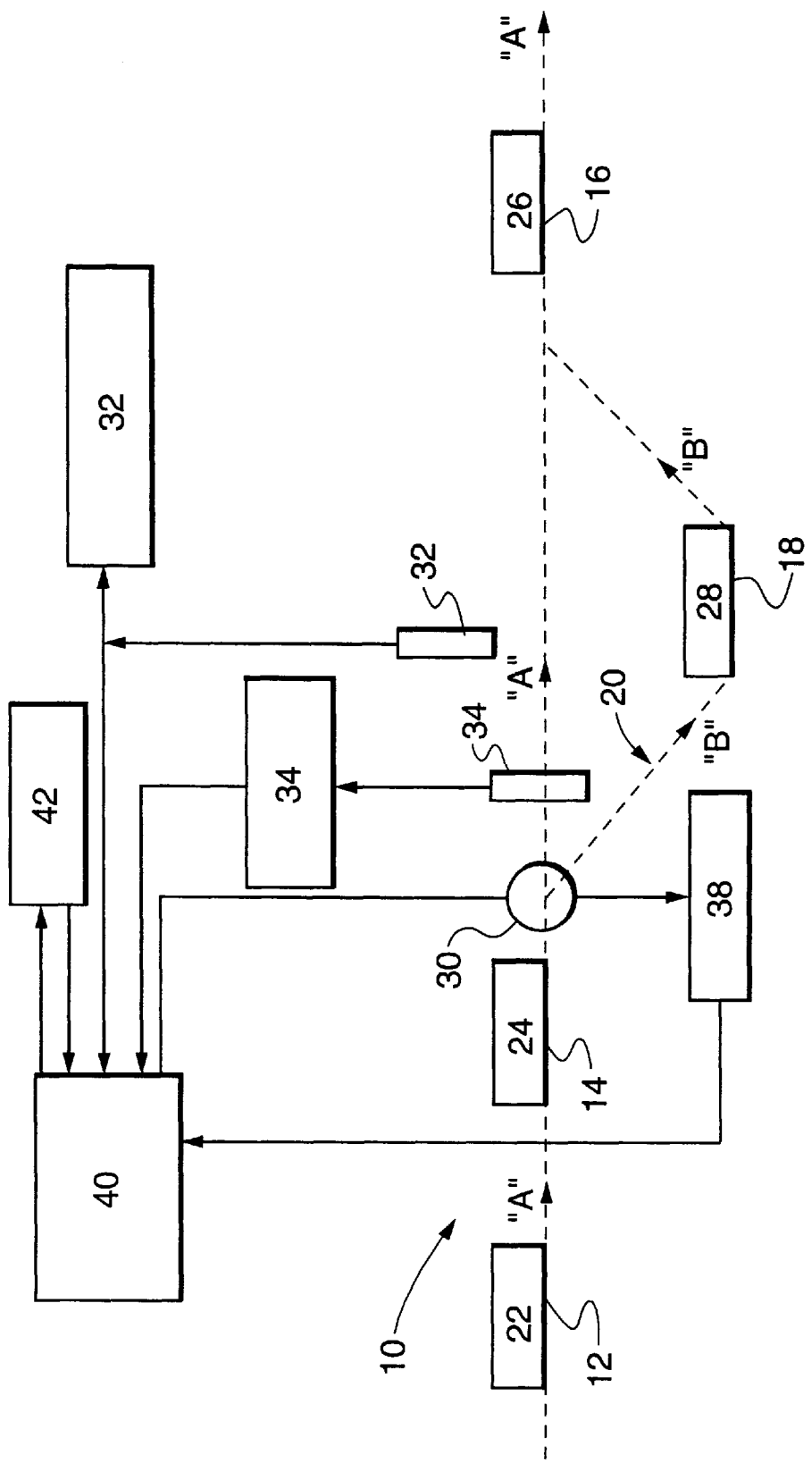
FIG. 1 shows a preferred embodiment of a process control system utilizing the present invention.

Referring to FIG. 1, according to the present invention, there is shown a system comprising a production line 10 comprising a plurality of work stations 12, 14, and 16. The flow of units along the production line is along arrows "A". As shown in FIG. 1, units 22, 24, and 26 are units under production in this manufacturing line located in work stations 12, 14, and 16 respectively.

As each unit is worked upon and the work completed in each station the unit moves to the next station along production line 10 and arrows "A".

The production line 10 includes a station 18 which is a designated station to which only a number of selected production units are diverted for testing or for conducting on such units an operation which is different from the sequence of operations performed on all units in the production line. Station 18 is shown as being accessed through a diverting line 20 along arrow "B".

Station 14 is shown as the last station prior to the diverting line 20 and station 16 is the station which normally follows station 14 along the production line.

A unit counter 32 is located along production line 10 and counts the number of units which bypass the designated station 18, that is the number of units which are not selected to go to the designated station for the extra operation. A second unit counter 34 counts the units diverted to the designated work station 18. Thus counter 32 generates a unit bypass count and counter 34 generates a selected unit count. Such counters are well known in the art and may preferably produce a digital signal whose value is an indication of the number of units counted by the counter.

Counters 32 and 34 may also be part of a computer system which keeps track of the progress of the production units through the different work stations in the production line, in which case the count may be either automatically entered or be the result of information entered in the system by an operator at the work station. Whatever the nature of the counters 32 and 34, such counters are connected to a controller 40 and produce a signal representing the respective counts of units bypassing the designated area and going to the designated area.

The system further comprises a first clock 38 which is connected to controller 40 and which resets and measures elapsed time whenever a production unit is diverted to station 18.

Optionally, the system comprises a second clock 42 which measures time and resets whenever a predetermined preset time period elapses. This second clock is also connected to the controller providing its output thereto.

The controller 40 is typically a computer and includes a CPU, a memory, and input and output means whereby data may be entered and commands may be executed. Output may include transducers to execute commands by physically actuating mechanical components, or may be in the form of presenting direction on a CRT display for execution by an operator. In the system illustrated in FIG. 1, the controller 40 is shown connected to a diverting device 30. Such device may be an actuator that pushes a unit out of the main production line to the designated station or may be a visual or audio signal to an operator to remove this unit and transport it to work station 18. The exact nature of the action by the controller depends on the nature of the production line and whether such production line is fully automated, or only partially so. The technology for actually diverting a selected unit is not of particular interest to the present invention, which is directed to how any one of the plurality of units being processed in the production line is selected to go to the designated station or will be allowed to bypass it.

As mentioned earlier, the controller 40 includes a memory. In the memory, there is retrievably stored a set of parameters defining desired limits or criteria for selecting units to be diverted. Such criteria are a first preset time interval, a unit bypass count, and a selected unit count. The controller is programmed to compare the outputs of clock 38 and counters 32 and 34 to their respective preset criteria and perform the following logic functions for each production unit leaving station 14:

1) If the output of the first time interval from clock 38 is equal to or greater than the preset value for the first time interval, and if the output of the selected unit counter 34 is a lesser count than the preset value for the selected unit count; or 2) if the unit bypass counter 32 output is equal to or greater than the preset value for the unit bypass count and the selected unit counter 34 output is less than the preset value for the selected unit count, the controller outputs a command to divert the production unit to the designated station.

Figure 2:
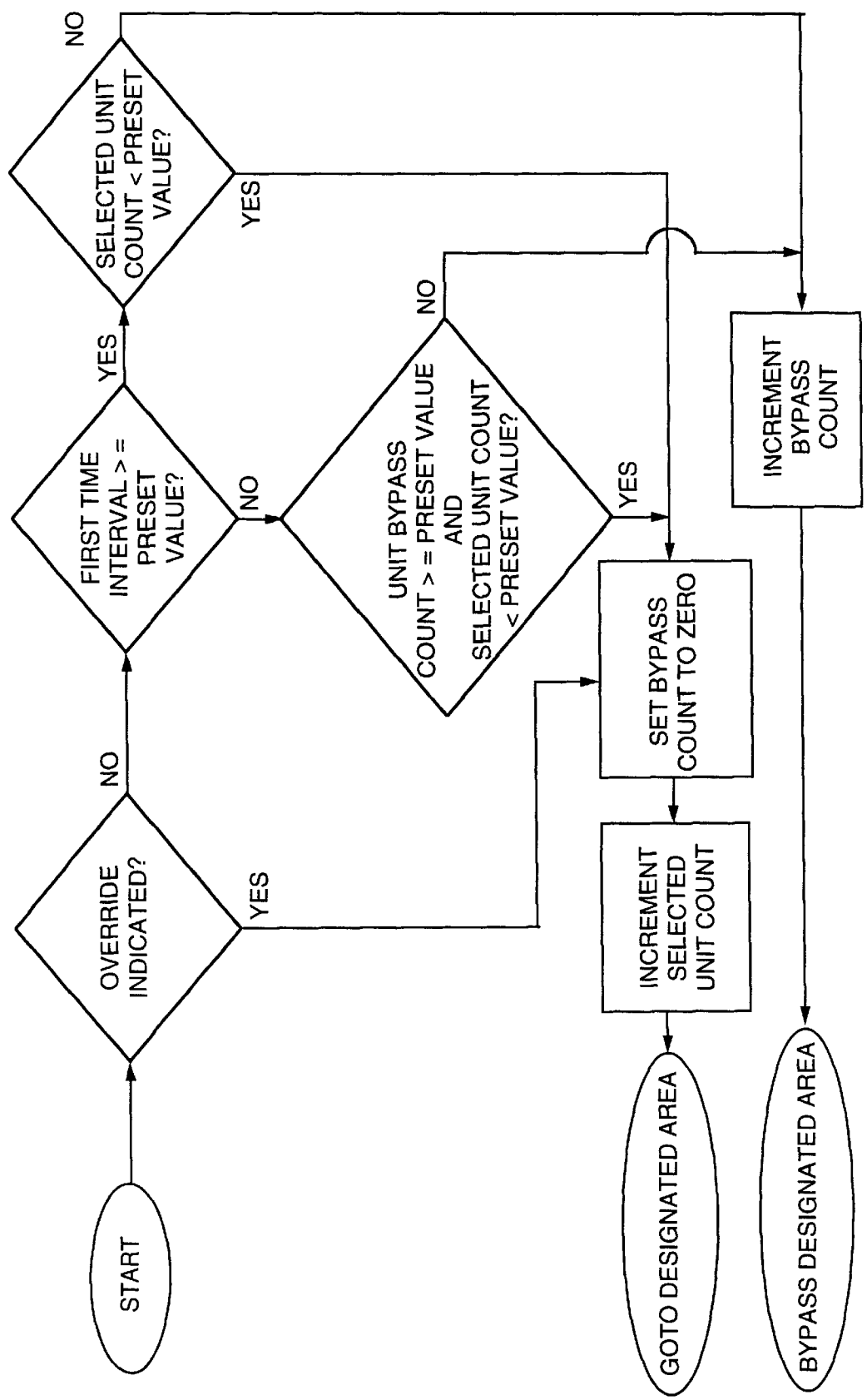
FIG. 2 shows a flow diagram of the method described in the present invention.

FIG. 2 shows the programmed logic flow for implementing the above described process of unit selection to be diverted to the designated area, in block diagram form. For each unit exiting work station 14 the following logic steps are performed in controller 40:

1. Check if the unit has associated with it an indicator directing the unit to the designated area without comparing measured signals to preset values. If the answer is YES the controller directs the unit to the designated area, resets the bypass counter and increments the selected unit counter by one. If the answer is NO the controller checks the first time interval, that is the time interval that has elapsed since the last unit diverted to the designated area.

2. Check the time interval elapsed since the last unit was diverted to the designated area, to determine if it has exceeded the preset value.
    (a) If the answer is NO the controller further checks the Bypass counter output and the unit select counters to determine if the bypass counter value is equal to or grater than the preset value and the select count is less than the preset count. If the answer is YES the unit is diverted to the designated area, the bypass counter is reset and the unit select counter is incremented by one. If the answer is NO the unit moves along to the next station in the production line for further processing, bypassing the designated area, and the unit bypass counter is incremented by one.
    (b) If the answer is YES the controller performs a further inquiry. Is the unit select counter output less than the preset count? If the answer is YES the unit is diverted to the designated area the bypass counter is reset and the unit select counter is incremented by one. If the answer is NO the unit moves along to the next station in the production line for further processing, bypassing the designated area, and the unit bypass counter is incremented by one.

The system described herein above implements a production unit selection process which involves the following steps in sequence:

a) counting the number of production units that bypass the designated area beginning every time a production unit is diverted to the designated area, to obtain a unit bypass count;

b) Counting the number of units diverted to the designated area to obtain a selected unit count;

c) Measuring a first time interval beginning every time a production unit is diverted to said designated area by resetting the first clock every time a unit is selected for diversion to the designated area; and d) Comparing the unit bypass count, the selected unit count and the first time interval to a preset value for each of said unit bypass count, selected unit count and first time interval respectively; and:

1) diverting a unit to the designated area when the measured first time interval is equal to or greater than the preset value for the first time interval; or 2) diverting a unit to the designated area when the unit bypass count is equal to or greater than the preset value for the unit bypass count and the selected unit count is less than the preset value for the selected unit count.

Preferably, the process is repeated continuously by resetting and restarting the first clock every time a unit is diverted to the designated station. A second timed period may be measured beginning with the start of the selection process. This second time period may be used to reset the selected unit counter. In such manner, the whole process may repeat itself at regular intervals which may be selected to correspond to shift changes or other production time spans, i.e. a week, a week end, a work shift, etc. The second time period may be determined by a separate, second clock, or the controller may use the output of the first clock to measure two time intervals.

The method and system for implementing the method as described herein can also be adapted for uses where the normal flow of production units is through the designated area and the method or system selects those units that will bypass the designated area. In such a use, the step of diverting a production unit to the designated area is equivalent to allowing the unit to proceed in the normal flow without bypassing the designated area. In a use where the normal flow of production units bypasses the designated area, the step of bypassing the designated area is equivalent to allowing the unit to proceed in the normal flow. Both uses of the method or system are equivalent, and differ only in viewpoint of the user. The key element embodied in the present invention as used in a manufacturing line of either viewpoint, is the execution of a selection process using the criteria disclosed herein to determine which units will go to the designated area.

Also, rather than being a specific location, the designated area may be a specific operation performed on a unit as it moves through the normal work stations in the production line. In such case the "diverting" step becomes synonymous with a selecting step, whereby a particular unit is selected for a specific operation that is not a routine operation in the normal production flow.

Those skilled in the art having the benefit of the teachings of the present invention as hereinabove set forth, can effect numerous modifications thereto. These modifications are to be construed as being encompassed within the scope of the present invention as set forth in the appended claims.

What is claimed:

1. In a manufacturing line wherein a plurality of production jobs are performed on a plurality of production units in a plurality of processing areas, a method for diverting a number of said plurality of production units to a designated area other than the plurality of processing areas, comprising the steps of:

a) counting the number of production units that bypass the designated area beginning every time a production unit is diverted to said designated area, to obtain a unit bypass count;

b) counting the number of production units diverted to the designated area to obtain a selected unit count;

c) measuring a first time interval beginning every time a production unit is diverted to said designated area;

d) comparing the unit bypass count, the selected unit count and the first time interval to a preset value for each of said unit bypass count, selected unit count and first time interval respectively; and:

1) diverting one of said plurality of production units to the designated area when the measured first time interval is equal to or greater than the preset value for the first time interval and the selected unit count is less than the preset value for the selected unit count;

2) diverting one of said plurality of production units to the designated area when the unit bypass count is equal to or greater than the preset value for the unit bypass count and the selected unit count is less than the preset value for the selected unit count.

2. The method according to claim 1 further comprising the additional step of performing the process of steps (a) through (d) for a preset time period.

3. The method according to claim 2 wherein at the expiration of the preset time period the selected unit count is set to zero and steps (a) through (d) are repeated.

4. The method according to claim 1, wherein any number of said plurality of production units may be associated with an override marker and the method further comprises diverting a production unit so associated with said marker to the designated area without performing step (d).

5. Within a manufacturing line wherein a plurality of production jobs are performed on a plurality of production units in a plurality of processing areas, a system for diverting a number of said plurality of production units to a designated area other than the plurality of processing areas, comprising:

a first clock which measures a first time interval beginning every time a production unit is diverted to the designated area, wherein said first clock also outputs a first time interval signal having a value representing said time interval;

a unit bypass counter which outputs a unit bypass count signal having a value representing the number of production units that have bypassed the designated area since the last production unit diverted to the designated area;

a selected unit counter which outputs a selected unit count signal having a value representing the number of production units diverted to the designated area;

a memory containing a preset value for said unit bypass count, a preset value for said selected unit count, and a preset value for said first time interval;

a controller connected to said memory, said first clock, said unit bypass counter and said selected unit counter, said controller including a comparator for comparing the signal from the unit bypass counter, from the selected unit counter, and from the first time clock to the respective preset values stored in said memory, said controller also including a unit selection device to divert one of the plurality of production units to the designated area, when:

either the value of said first time interval signal is greater than or equal to the preset value for said first time interval, and the value of said selected unit count signal is less than the preset value for said selected unit count; or the value of said unit bypass count is greater than or equal to the preset value for said unit bypass count, and said selected unit count signal is less than the preset value for said selected unit count.

6. The system according to claim 5 further comprising a second clock which measures a preset time period during which the system operates.

7. The system according to claim 6 wherein said controller has further means to activate an override which prompts said controller to divert all said production units to the designated area without comparing said preset values to said first count, said second count, and said first time interval.

8. The system according to claim 7 where the designated area is an area where product quality testing or analysis is performed.

9. The system according to claim 8, where the production unit is a job lot in an integrated circuit manufacturing process.

10. The system according to claim 6 wherein at the expiration of said preset time period, said selected unit counter is reset to zero, and the system operates for another said preset time period.

11. The system according to claim 10 wherein said controller has further means to activate an override which prompts said controller to divert all said production units to the designated area without comparing said preset values to said first count, said second count, and said first time interval.

12. The system according to claim 11 where the designated area is an area where product quality testing or analysis is performed.

13. The system according to claim 12, where the production unit is a job lot in an integrated circuit manufacturing process.

14. The system according to claim 10, wherein said preset time period is one week.

15. The system according to claim 5 wherein said controller has further means to activate an override which prompts said controller to divert all said production units to the designated area without comparing said preset values to said first count, said second count, and said first time interval.

16. The system according to claim 15 where the designated area is an area where product quality testing or analysis is performed.

17. The system according to claim 16, where the production unit is a job lot in an integrated circuit manufacturing process.

18. A program storage device readable by a machine, tangibly embodying a program of instructions executable by the machine to perform the method steps for diverting a number of a plurality of production units to a designated area other than a plurality of processing areas, said method steps comprising:

a) counting the number of production units that bypass the designated area beginning every time a production unit is diverted to said designated area, to obtain a unit bypass count;

b) counting the number of production units diverted to the designated area to obtain a selected unit count;

c) measuring a first time interval beginning every time a production unit is diverted to said designated area;

d) comparing the unit bypass count, the selected unit count and the first time interval to a preset value for each of said unit bypass count, selected unit count and first time interval respectively; and:

1) diverting one of said plurality of production units to the designated area when the measured first time interval is equal to or greater than the preset value for the first time interval and the selected unit count is less than the preset value for the selected unit count; or 2) diverting one of said plurality of production units to the designated area when the unit bypass count is equal to or greater than the preset value for the unit bypass count and the selected unit count is less than the preset value for the selected unit count.

* * * * *